No. 702,495. Patented June 17, 1902.
D. E. SHINN.
FILTER.
(Application filed Dec. 31, 1901.)
(No Model.)
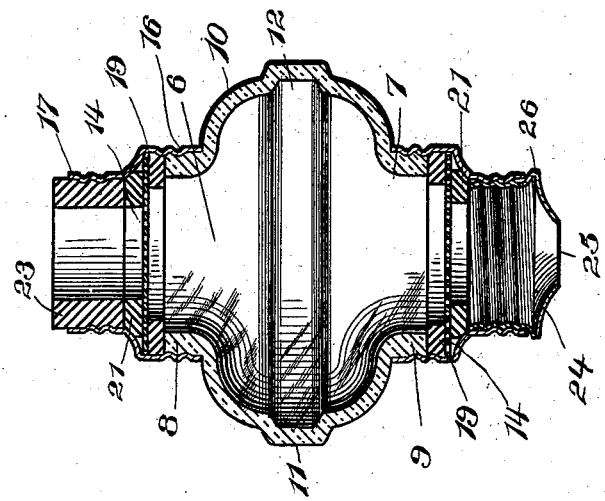
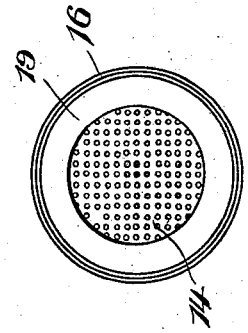
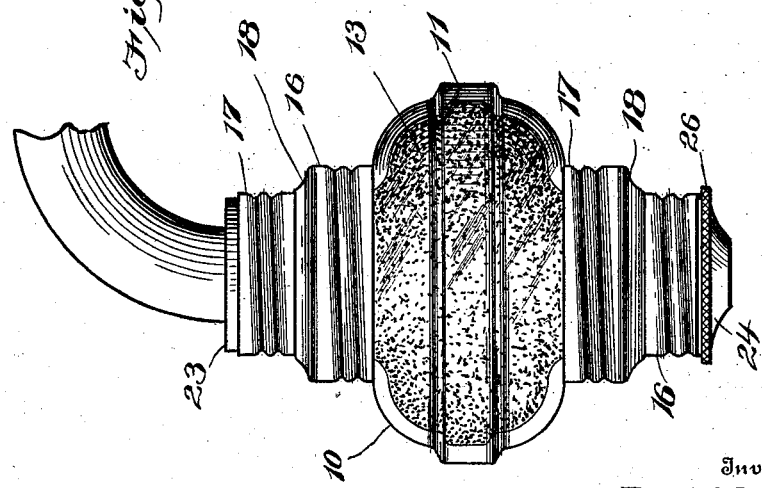
Witnesses
Inventor
D. E. Shinn,
By Chandler & Chandler
Attorneys

UNITED STATES PATENT OFFICE.

DELLA EDITH SHINN, OF BROOKLYN, NEW YORK.

FILTER.

SPECIFICATION forming part of Letters Patent No. 702,495, dated June 17, 1902.

Application filed December 31, 1901. Serial No. 87,926. (No model.)

*To all whom it may concern:*

Be it known that I, DELLA EDITH SHINN, a citizen of the United States, residing at Brooklyn, in the county of Kings, State of New York, have invented certain new and useful Improvements in Filters; and I do hereby declare the following to be a full, clear, and exact description of the invention, such as will enable others skilled in the art to which it appertains to make and use the same.

This invention relates to filters in general; and it has for its object to provide a filter which will be simple and cheap of construction and which will be particularly adaptable to use on faucets for filtering water, a further object of the invention being to provide a construction which may be quickly applied to and removed from a faucet, which will consist of few parts, which may be easily and quickly cleaned, and which will be efficient in its operation.

An additional object of the invention is to provide a filter in which the filtering-bed will be visible, so that its condition may be seen without disassembling the filter.

In the drawings forming a portion of this specification, and in which like numerals of reference indicate similar parts in the several views, Figure 1 is a side elevation of the filter attached to a faucet. Fig. 2 is a central vertical section of the filter. Fig. 3 is an inner end view of one of the metallic ends which is screwed onto the central glass body.

Referring now to the drawings, the filter comprises a central body portion 10, which is preferably formed of glass and is in the form of an oblate spheroid, at the ends of the minor axis of which are the openings 6 and 7, which are continued through the necks 8 and 9, which are cylindrical in form and are provided with exterior threads. Circumferentially of the body portion 10 is formed a flange 11 and in the inner periphery of the body portion is a corresponding angular groove 12. In the body portion 10 is disposed a filter-bed 13, which may be of sand or other suitable filtering material. Two sleeves are employed—one for each neck 8 and 9 of the central body portion 10 of the filter. Each sleeve is formed of metal, and consists of a major end portion 16 and a minor end portion 17, both of which are cylindrical, and in which are pressed threads, as shown, the major and minor end portions being separated by a shoulder 18, against which is disposed a rubber washer 19, and within the major portion and against the rubber washer is disposed a sieve 14. The major end portions of the sleeves are screwed onto the necks 8 and 9 of the body of the filter and against the ends of the necks are disposed other rubber washers 21, against which the sieves impinge when the sleeves are screwed firmly into place. Each sieve is thus clamped between a shoulder 18 and the end of the corresponding neck of the body, so that passage of water from the body excepting through the sieves is prevented. These sieves, it will be understood, hold the filter-bed in place.

In applying the filter to a faucet a rubber bushing 23 is disposed in the outer or minor end of a sleeve at one end of the filter, and which bushing is of such size as to snugly receive the end of the faucet with such friction as to hold the filter on the faucet, it being understood that by providing a number of bushings of different diameters or having different bores, the filter may be used upon different-sized faucets. The opposite end of the filter or the sleeve of the opposite end is provided with a bushing in the form of a metal tube 24, having a reduced opening 25 in its end, the web which partly closes the outer end of this bushing being projected downwardly to an extent sufficient to insure the flow of an even stream from the opening, and to facilitate application and removal of this bushing it is provided with a flange 26, having a milled edge, this bushing having threads pressed therein to engage the threads of the minor end of the sleeve.

It will be understood that in practice changes in the specific construction shown may be made and that any suitable materials and proportions may be used for the various parts without departing from the spirit of the invention.

What is claimed is—

As an article of manufacture, a filter comprising a glass body portion having reduced, cylindrical, tubular ends having threads pressed thereon, a sheet-metal sleeve for each tubular end comprising a major portion, a minor portion and an intermediate shoulder, said major and minor portions having threads pressed therein the major portions of the sleeves being screwed onto the reduced portions of the body, a pair of rubber washers disposed between the end of each reduced portion of the body and the shoulder of the sleeve engaged therewith, a perforated plate held between each pair of washers, a reducing bushing formed of sheet metal and having tapered end portions, a rubber bushing having exterior threads formed thereon said bushings being screwed into the minor portions of the sleeves and each being adapted for engagement with either of said minor portions, and a filter-bed in the body between the perforated plates.

In testimony whereof I hereunto sign my name, in the presence of two subscribing witnesses, on the 10th day of December, 1901.

DELLA EDITH SHINN.

Witnesses:
GEO. CONDIT,
EMMA A. HUTCHINS.